US011989994B2

(12) United States Patent
Woo

(10) Patent No.: US 11,989,994 B2
(45) Date of Patent: May 21, 2024

(54) BUNDLE MODULE OF MEDIUM DEPOSIT DEVICE

(71) Applicant: HYOSUNG TNS INC., Seoul (KR)

(72) Inventor: Hyun Sik Woo, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 323 days.

(21) Appl. No.: 17/377,428

(22) Filed: Jul. 16, 2021

(65) Prior Publication Data

US 2022/0028202 A1 Jan. 27, 2022

(30) Foreign Application Priority Data

Jul. 23, 2020 (KR) ........................ 10-2020-0091880

(51) Int. Cl.

*G07D 11/14* (2019.01)
*G07D 11/16* (2019.01)
*G07D 11/235* (2019.01)
*G07D 7/20* (2016.01)

(52) U.S. Cl.

CPC ............. *G07D 11/14* (2019.01); *G07D 11/16* (2019.01); *G07D 11/235* (2019.01); *G07D 7/20* (2013.01); *G07D 2207/00* (2013.01); *G07D 2211/00* (2013.01)

(58) Field of Classification Search

CPC .. B65H 31/3054; B65H 29/14; B65H 29/145; B65H 29/22; G07D 11/14; G07D 2211/00; G07D 11/16; G07D 11/235

See application file for complete search history.

(56) References Cited

U.S. PATENT DOCUMENTS

2011/0133389 A1* 6/2011 Nemoto ................. B65H 29/34 271/220
2013/0099439 A1* 4/2013 Duesterhus ............ G07D 11/14 271/3.01

FOREIGN PATENT DOCUMENTS

GB 2161145 A 8/1986

OTHER PUBLICATIONS

OA cited in GB Appln. No. 2110499.7 dated Apr. 21, 2022.

* cited by examiner

*Primary Examiner* — Jeremy R Severson
(74) *Attorney, Agent, or Firm* — BACON & THOMAS, PLLC

(57) ABSTRACT

The present invention is directed to providing to a bundle module of a medium deposit device capable of not only arranging leading ends of rejected bill media which are returned to the bundle module but also preventing collision between a leading medium and a following medium and a jam occurrence of the media according to the collision. In the present invention to implement the objectives, a bundle module of the medium deposit device, in which deposit media in units of bundles are input or which receives rejected bill media in units of bundles, includes a transfer path which provides a deposit path or reject path of media, a first belt which is provided above the transfer path and rotatably driven, a second belt which is provided under the transfer path and rotatably driven and on which the media are loaded and stacked, and a guide unit which is provided at one side of the first belt to provide a transfer surface for the deposited or rejected media, wherein, when the media are rejected, the guide unit rotates to be inclined downward toward one side so that a leading end portion of a rejected following medium is positioned on and overlaps a rear end portion of a rejected leading medium.

7 Claims, 4 Drawing Sheets

[FIG.1]
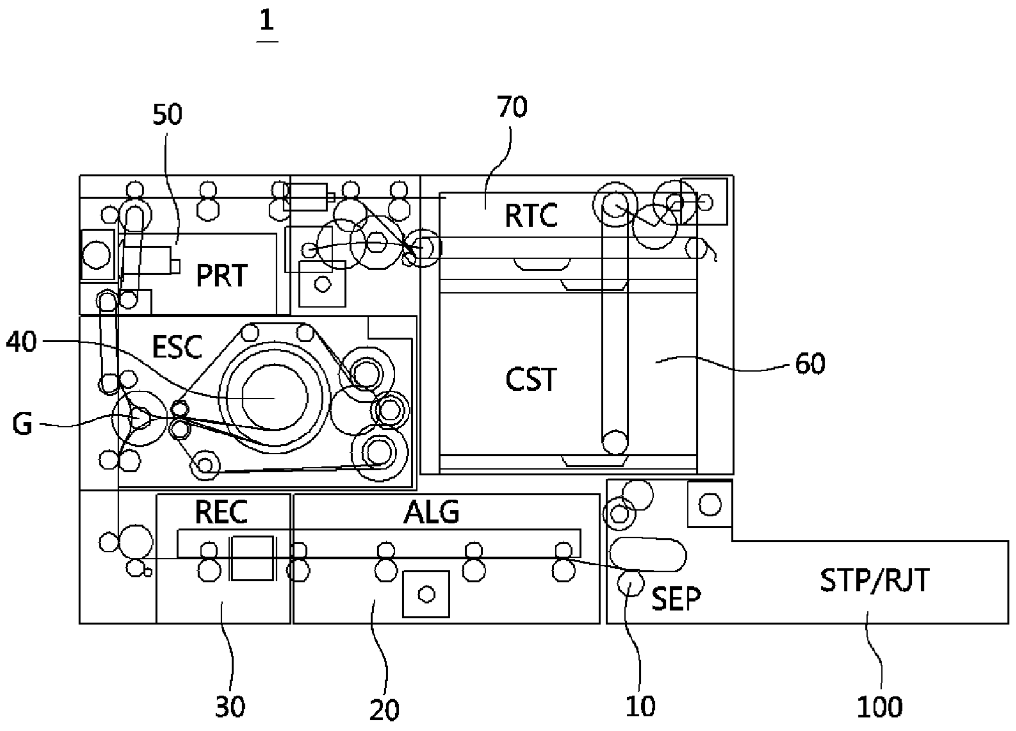
[FIG.2]
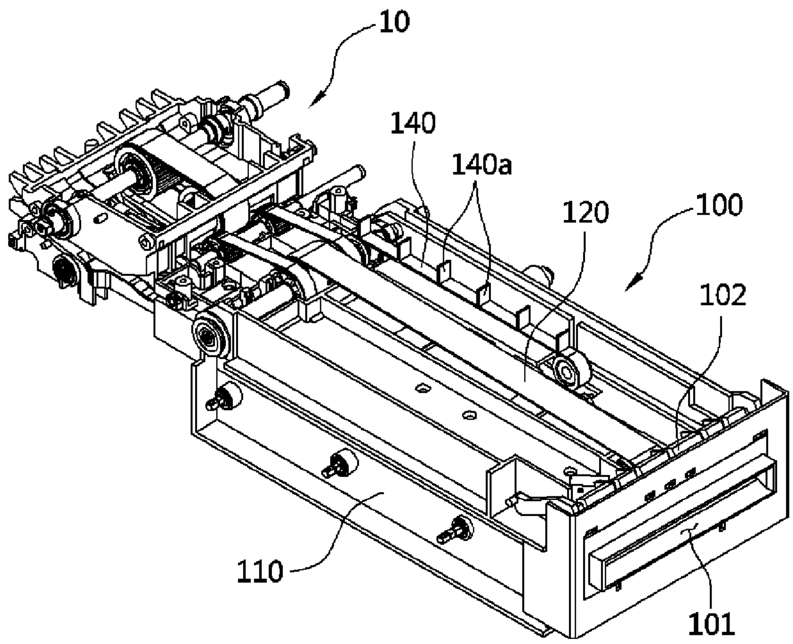

[FIG.3]
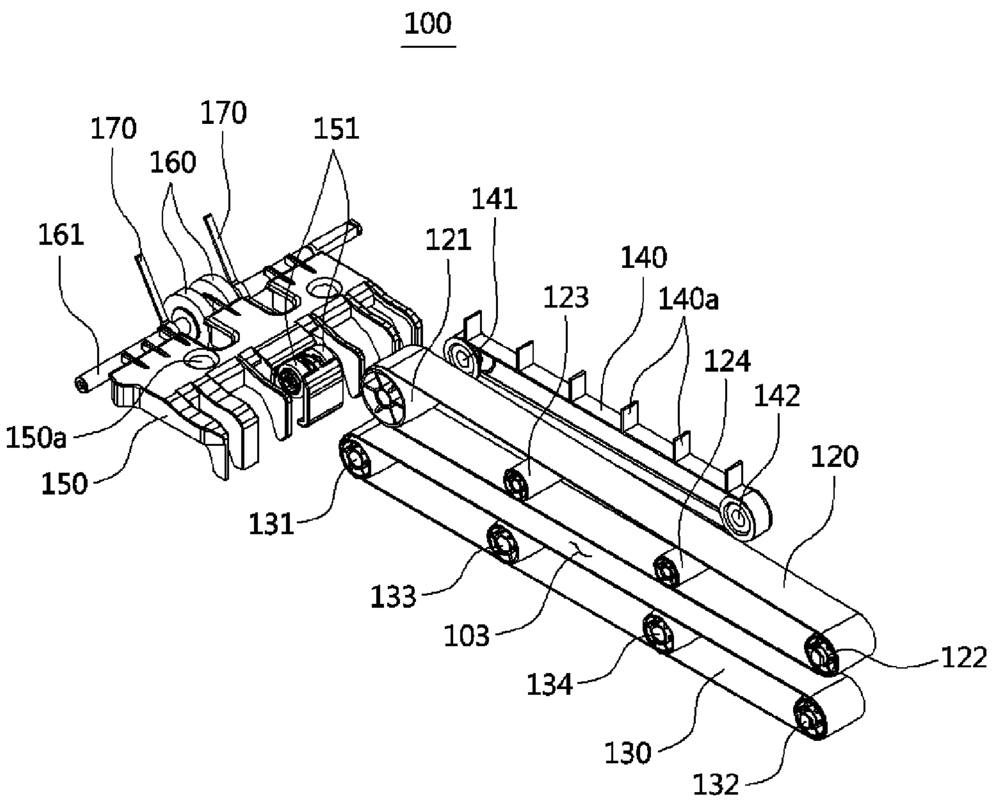
[FIG.4]
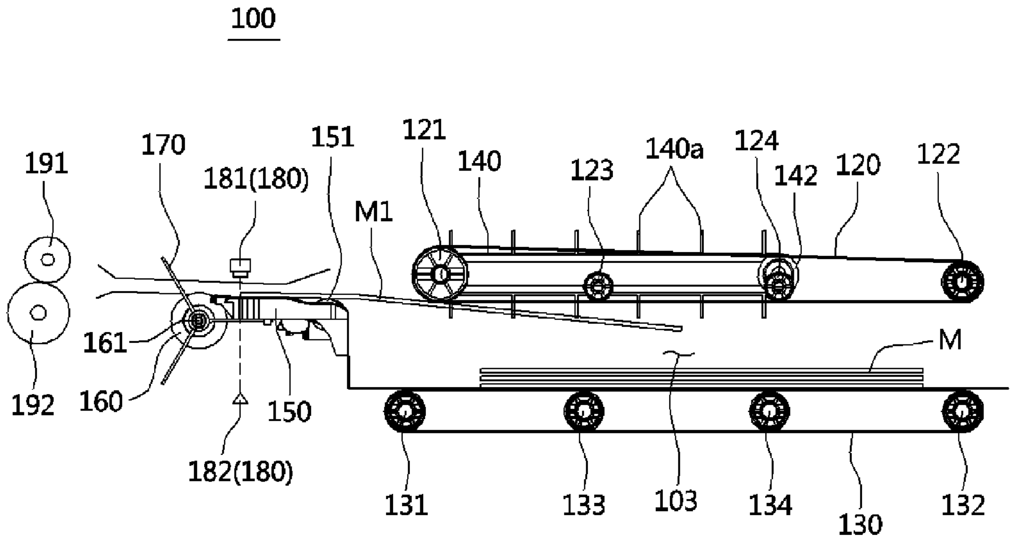

[FIG.5]
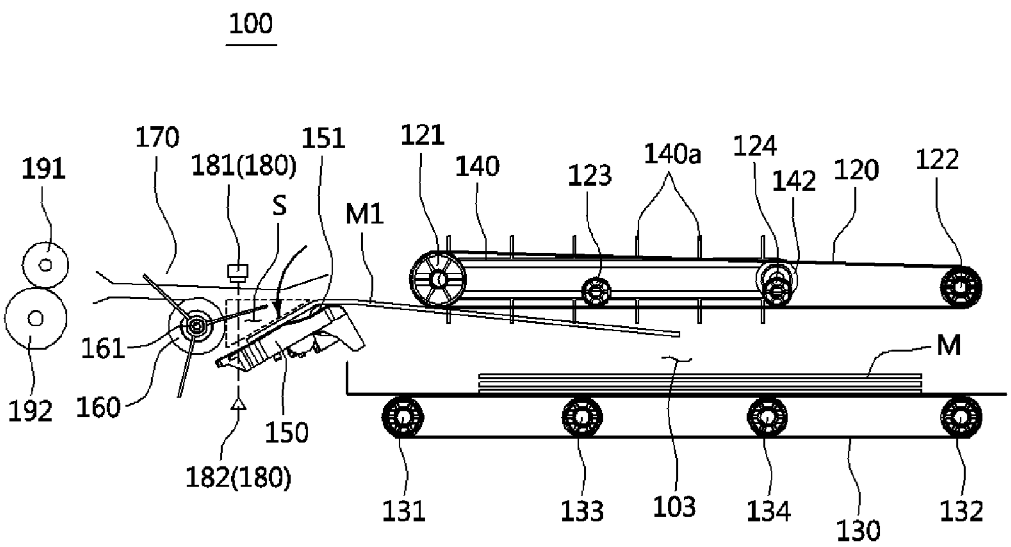
[FIG.6]
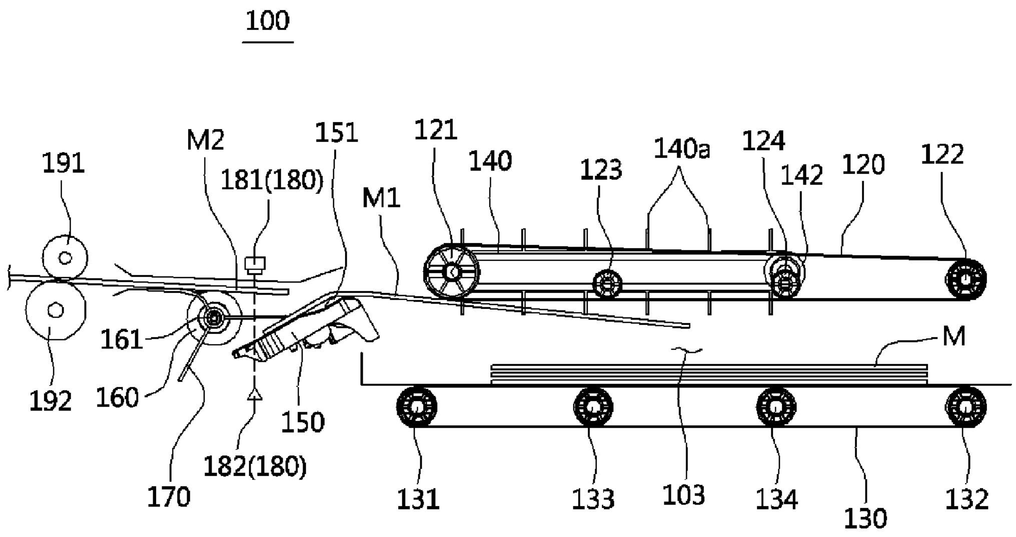

[FIG.7]
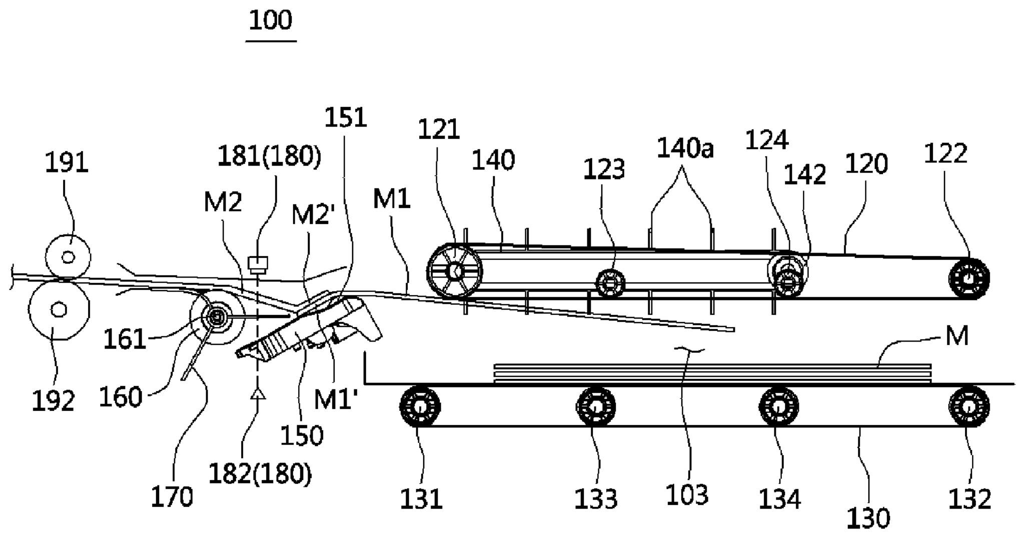
[FIG.8]
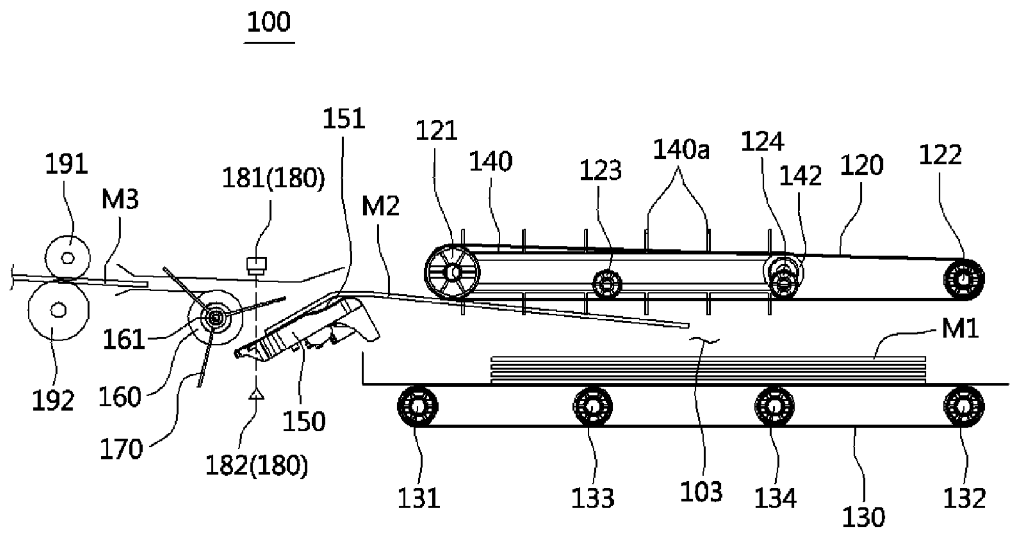

BUNDLE MODULE OF MEDIUM DEPOSIT DEVICE

This application claims priority to and the benefit of Korean Patent Application No. 10-2020-0091880, filed on Jul. 23, 2020, the disclosure of which is incorporated herein by reference in its entirety.

BACKGROUND

1. Field of the Invention

The present invention relates to a bundle module of a medium deposit device, and more specifically, to a bundle module of a medium deposit device which not only arranges leading ends of rejected bill media which are returned to the bundle module but also prevents the media returned to the bundle module one by one from colliding with each other and jamming due to the collision.

2. Discussion of Related Art

Conventional automated teller machines are machines which relate to unmanned financial services, are capable of quickly and conveniently providing most financial services excluding counseling services regardless of time, and include cash dispenser units (CDUs), bill recycling machines (BRMs), cash and check in modules (CCIMs) capable of performing processes of depositing and rejecting media such as a plurality of bills and checks in units of bundles at the same time, and the like.

A conventional medium deposit device includes a bundle module for inputting and receiving media in units of bundles, a separating unit which separates the media input to the bundle module into individual sheets of the media, a discrimination unit for discriminating information and authenticity of the deposited media which pass through and are returned to the separating unit, a print module for printing necessary information relating to a deposited check, a cassette unit in which a medium discriminated as a normal bill in the discrimination unit is stored among the deposited media, and a reject module in which, among the deposited media, a medium discriminated as a rejected bill in the discrimination unit or a medium that is deposited and receipt-canceled is returned and stored, and which returns the rejected bill to the bundle module in units of bundles.

Since the conventional medium deposit device configured as described above has a structure in which the reject module is separately provided between the discrimination unit and the bundle module, when deposit is canceled, all rejected bills are returned to and stored in the reject module, and the rejected bills are returned to the bundle module in units of bundles. Accordingly, when the media are returned in units of bundles at the same time, there are problems in that disorder of the media occurs, a residual error occurs on a transfer path, leading ends of the media are not arranged due to various sizes of the media, and the media remain on the transfer path and are dispensed to a user several times. Particularly, there is a problem in that as the number of stacked bills increases, the corresponding errors increase.

In addition, in the conventional medium deposit device, when rejected bills are returned to the bundle module and stacked one by one, since a rear end portion of a medium which is returned earlier and a leading end portion of a following medium collide with each other and are jammed, there is a problem in that a return error occurs.

The related art of the medium deposit device is disclosed in Korean Patent Registration No. 10-1581725.

SUMMARY OF THE INVENTION

The present invention is directed to providing to a bundle module of a medium deposit device capable of not only arranging leading ends of rejected bill media which are returned to the bundle module but also preventing collision between a leading medium and a following medium and a jam occurrence of the media according to the collision.

According to an aspect of the present invention, there is provided a bundle module of a medium deposit device, in which deposit media in units of bundles are input or which receives rejected bill media in units of bundles, the bundle module including a transfer path which provides a deposit path or reject path of media, a first belt which is provided above the transfer path and rotatably driven, a second belt which is provided under the transfer path and rotatably driven and on which the stacked media are loaded, and a guide unit which is provided at one side of the first belt to provide a transfer surface for the deposited or rejected media, wherein, when the media are rejected, the guide unit rotates to be inclined downward toward one side so that a leading end portion of a rejected following medium is positioned on and overlaps a rear end portion of a rejected leading medium.

A medium sensing part configured to detect whether the rejected medium enters may be provided above the guide unit, and the bundle module may further include a controller which controls return of the leading medium to be stopped when the medium sensing part detects that a rear end of the entered leading medium has passed.

When the medium sensing part detects that the rear end of the leading medium has passed, the controller may control the guide unit to rotate to be inclined downward toward the one side.

When the guide unit rotates to be inclined downward toward the one side, the controller may control a gate roller provided at one side of the guide unit so that a following medium enters, and when the medium sensing part detects that a leading end of the following medium has passed, the controller may control the gate roller to stop movement of the following medium after the following medium further moves a predetermined distance so that a leading end portion of the following medium is positioned on and overlaps a rear end portion of the leading medium.

A stack roller configured to press the rear end portion of the leading medium against an upper surface of the guide unit may be coupled to a rotary shaft to which the gate roller is coupled.

When the leading end portion of the following medium is positioned on and overlaps the rear end portion of the leading medium, the leading medium and the following medium may be rejected and returned at the same time so that the leading medium is transferred to a preset loading position.

When the medium is deposited, the guide unit may be horizontally positioned to provide a transfer surface for the deposited medium.

The second belt may move in an upward direction toward the first belt to bring the loaded media into contact with the first belt when the media are deposited, and move in a downward direction to be spaced apart from the first belt to provide a space in which a rejected and returned medium is loaded when the medium is rejected and returned.

A third belt configured to provide a transfer force so as to transfer a rejected bill medium to a preset loading position may be further provided at one side of the first belt, and a plurality of return sheets which are spaced apart from each other in a longitudinal direction and protrude outward may be provided on an outer surface of the third belt.

The guide unit may include a separation roller, and when the media are deposited, rotation of the separation roller may be stopped so that the loaded media are separated into individual sheets, and when the medium is rejected, the separation roller may rotate to provide a return force to a rejected bill medium when the medium is rejected.

Effects of the Invention

According to the bundle module of a medium deposit device according to the present invention, leading ends of rejected bills returned to the bundle module are arranged so that media in an evenly arranged state can be returned to a customer.

In addition, when the media are rejected and returned, the rear end portion of the leading medium and the leading end portion of the following medium are returned in a partial overlapping state so that collision between the leading medium and the following medium and a jam occurrence of the media according to the collision can be prevented.

In addition, since a structure of a reject module included in a conventional medium deposit device is omitted, and a function of the reject module is integrated with the bundle module, a transfer path and a jam occurrence of the media can be reduced, a structure of a device can be simplified, and a return process of the rejected bills can be simply and quickly performed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a schematic view illustrating a structure of a medium deposit device including a bundle module of a medium deposit device according to the present invention;

FIG. 2 is a perspective view illustrating a separating unit and the bundle module of the medium deposit device according to the present invention;

FIG. 3 is a perspective view illustrating main parts of the bundle module of the medium deposit device according to the present invention;

FIG. 4 is a view illustrating a shape in a state in which a rejected bill medium enters the bundle module and a rear end portion of the rejected bill medium is supported by an upper surface of a guide unit;

FIG. 5 is a view illustrating a shape in a state in which the guide unit rotates toward one side and the rear end portion of the rejected bill medium supported by the upper surface of the guide unit is inclined toward one side;

FIG. 6 is a view illustrating a shape in which a following rejected bill medium is moved toward the bundle module and the movement is stopped, and a rear end portion of a leading rejected bill medium is pressed against the upper surface of the guide unit due to a stack roller;

FIG. 7 is a view illustrating a shape in which the rear end portion of the leading rejected bill medium and a leading end portion of the following rejected bill medium are rejected and returned in an overlapping state; and FIG. 8 is a view illustrating a shape in which the leading rejected bill medium is returned to and stacked in a medium stack space in the bundle module, a rear end portion of the following rejected bill medium is supported by the upper surface of the guide unit in an inclined state, and another following rejected bill medium is moved toward the bundle module.

DETAILED DESCRIPTION OF EXEMPLARY EMBODIMENTS

In the description below, the term "leading end" of a medium denotes an end of a front side of the medium based on a direction in which the medium moves forward, and the term "rear end" of the medium denotes an end of a rear side of the medium based on the direction in which the medium moves forward.

First, a medium deposit device 1 including a bundle module 100 of a medium deposit device according to the present invention will be described with reference to FIG. 1.

The medium deposit device 1, to which the present invention is applied, may include the bundle module 100 for inputting and receiving media in units of bundles, a separating unit 10 for separating the media input to the bundle module 100 into individual sheets of the media, an align module 20 for arranging the media passing through the separating unit 10 at an exact position so that a recognition module 30 may recognize text, the recognition module 30 for discriminating information and authenticity of a deposited medium which passes through the align module 20 and is returned, an escrow module 40 which temporarily stores the medium passing through the recognition module 30, a print module 50 for printing necessary information relating to the deposited medium, and a retract module 70 in which a medium discriminated as a counterfeit bill by the recognition module 30 or medium returned to and not received by the bundle module 100 is returned and stored.

The bundle module 100 of a medium deposit device according to the present invention will be described with reference to FIGS. 2 to 8.

The bundle module 100 of a medium deposit device of the present invention, which is the bundle module 100 of the medium deposit device 1 for inputting deposit media in units of bundles or receiving rejected bill media in units of bundles, includes a transfer path 103 which provides a deposit path or reject path of media M, a first belt 120 which is provided above the transfer path 103 and rotatably driven, a second belt 130 which is provided under the transfer path 103 and rotatably driven and on which stacked media are loaded, and a guide unit 150 which is provided at one side of the first belt 120 to provide a transfer surface for a deposited or rejected medium, and it is characterized that, when the media M are rejected, the guide unit 150 rotates to be inclined downward toward one side so that a leading end portion M2' of a following medium M2 is positioned above and overlaps a rear end portion M1' of a rejected leading medium M1.

In the bundle module 100, a medium input and receipt port 101 is provided in one side portion of a main body 110, and a shutter 102 for opening and closing the medium input and receipt port 101 is provided.

The first belt 120 is connected to a drive source (not shown), is provided to run between a first pulley 121 provided at one side in a longitudinal direction of the main body 110 and a second pulley 122 provided at the other side in the longitudinal direction of the main body 110, and is provided to rotate in both directions.

A first support roller 123 and a second support roller 124 for supporting a lower end portion of the first belt 120 when in contact with the medium M are provided between the first pulley 121 and the second pulley 122 at positions of both sides spaced apart from each other.

The second belt 130 is provided under the first belt 120, the transfer path 103 is formed between the second belt 130 and the first belt 120, and a rejected medium is loaded on an upper surface of the second belt 130.

The second belt 130 is connected to a drive source (not shown), is provided to run between a third pulley 131 provided at one side in the longitudinal direction of the main body 110 and a fourth pulley 132 provided at the other side in the longitudinal direction of the main body 110, and is provided to rotate in both directions.

A fifth pulley 133 and a sixth pulley 134 for supporting the loaded medium M are provided between the third pulley 131 and the fourth pulley 132 at positions of both sides spaced apart from each other.

When the medium M is deposited, the second belt 130 moves upward toward the first belt 120 to bring the medium M into contact with the first belt 120, and when the medium M is rejected and returned, the second belt 130 moves downward away from the first belt 120 to provide a space in which the rejected and returned medium is loaded.

A third belt 140 for providing a transfer force to transfer the rejected bill medium to a preset loading position is provided at one side of the first belt 120, and a plurality of return sheets 140*a* are provided on an outer surface of the third belt 140 to be spaced apart from each other in the longitudinal direction and protrude outward. The third belt 140 is connected to a drive source (not shown) and provided to run between a seventh pulley 141 provided at one side in the longitudinal direction of the main body 110 and an eighth pulley 142 provided at the other side.

The guide unit 150 for providing the transfer surface for the deposited or rejected medium M is provided at one side of the first belt 120. When the medium M is deposited, the guide unit 150 is horizontally positioned to provide the transfer surface for the deposited medium M.

The guide unit 150 includes a separation roller 151 of which rotation is stopped to separate loaded media M into individual sheets of the media M when the media M are deposited and which provides a return force to a rejected bill medium when the medium M is rejected.

In the guide unit 150, a through hole 150*a* is formed, and a medium sensing part 180 having a light-emitting part 181 and a light-receiving part 182 for detecting a passing medium M is formed above and under the through hole 150*a*.

A controller (not shown) for controlling return of a leading medium M1 and a following medium M2 on the basis of a signal detected by the medium sensing part 180 is further included.

A gate roller 160 is provided at one side of the guide unit 150, and a stack roller 170 for pressing a rear end portion M1' of the leading medium M1 against an upper surface of the guide unit 150 is coupled to a rotary shaft 161 to which the gate roller 160 is coupled.

Return rollers 191 and 192 for returning a medium M which passes through the separating unit 10 and enters are provided at one side of the stack roller 170.

Hereinafter, referring to FIGS. 4 to 8, a process of arranging a leading end of a medium at a preset exact loading position when the medium is rejected and returned will be described.

Referring to FIG. 4, when the medium sensing part 180 detects that a rear end of an entered leading medium M1 has passed, the controller controls return of the leading medium M1 to be stopped.

Referring to FIG. 5, when the medium sensing part 180 detects that the rear end of the entered leading medium M1 has passed, the controller controls the guide unit 150 to rotate to be inclined downward toward one side. In this case, as drawn with a dotted line in FIG. 5, an available space S, in which a leading end portion M2' of a following medium M2 may enter to be inclined downward, is provided above the guide unit 150.

Referring to FIG. 6, when the guide unit 150 rotates to be inclined downward toward one side, the controller controls the gate roller 160 provided at one side of the guide unit 150 to rotate so that the following medium M2 enters, and when the medium sensing part 180 detects that a leading end of the following medium M2 has passed, the controller controls the gate roller 160 to stop movement of the following medium M2 after the following medium M2 further moves a predetermined distance so that a leading end portion M2' of the following medium M2 is positioned on and overlaps a rear end portion M1' of the leading medium M1. At this time, the stack roller 170 rotates to press the rear end portion M1' of the leading medium M1 against the upper surface of the guide unit 150.

Referring to FIG. 7, when the leading end portion M2' of the following medium M2 is positioned on and overlaps the rear end portion M1' of the leading medium M1, the leading medium M1 and the following medium M2 are rejected and returned at the same time so that the leading medium M1 is transferred to a preset loading position.

FIG. 8 is a view illustrating a shape in which the rear end portion of the following medium M2 is positioned on the guide unit 150, and another following medium M3 enters, and operations of the FIGS. 5 to 8 are repeatedly performed until all rejected bill media are loaded at the preset loading position.

According to the bundle module 100 of a medium deposit device according to the present invention, leading ends of rejected bills returned to the bundle module are arranged so that media in an evenly arranged state can be returned to a customer.

In addition, when the media are rejected and returned, the rear end portion M1' of the leading medium M1 and the leading end portion M2' of the following medium M2 are returned in a partial overlapping state so that collision between the leading medium M1 and the following medium M2 and a jam occurrence of the media according to the collision can be prevented.

In addition, since a structure of a reject module included in a conventional medium deposit device is omitted, and a function of the reject module is integrated with the bundle module, a transfer path and a jam occurrence of the media can be reduced, a structure of a device can be simplified, and a return process of the rejected bills can be simply and quickly performed.

As described above, the present invention is not limited to the above-described embodiment, and modified embodiments may be clearly made by those skilled in the art without departing from the technical spirit of the present invention claimed by the claims, and such modified embodiments fall within the range of the present invention.

What is claimed is:

1. A bundle module of a medium deposit device, in which deposit media in units of bundles are input or which receives rejected bill media in units of bundles, the bundle module comprising:

a transfer path which provides a deposit path or reject path of media;

a first belt which is provided above the transfer path and rotatably driven;

a second belt which is provided under the transfer path and rotatably driven and on which the media are loaded and stacked; and a guide unit which is provided at one side of the first belt to provide a transfer surface for the deposited or rejected media, wherein, when the media are rejected, the guide unit rotates to be inclined downward toward one side so that a leading end portion of a rejected following medium is positioned on and overlaps a rear end portion of a rejected leading medium;

wherein: a medium sensing part configured to detect whether the rejected medium enters is provided above the guide unit; and the bundle module further comprises a controller which controls return of a leading medium to be stopped when the medium sensing part detects that a rear end of the entered leading medium has passed;

when the medium sensing part detects that the rear end of the leading medium has passed, the controller controls the guide unit to rotate to be inclined downward toward the one side;

when the guide unit rotates to be inclined downward toward the one side, the controller controls a gate roller provided at one side of the guide unit so that a following medium enters; and when the medium sensing part detects that a leading end of the following medium has passed, the controller controls the gate roller to stop movement of the following medium after the following medium further moves a predetermined distance so that a leading end portion of the following medium is positioned on and overlaps a rear end portion of the leading medium.

2. The bundle module of claim 1, wherein a stack roller configured to press the rear end portion of the leading medium against an upper surface of the guide unit is coupled to a rotary shaft to which the gate roller is coupled.

3. The bundle module of claim 1, wherein, when the leading end portion of the following medium is positioned on and overlaps the rear end portion of the leading medium, the leading medium and the following medium are rejected and returned at the same time so that the leading medium is transferred to a preset loading position.

4. The bundle module of claim 1, wherein the second belt:

moves in an upward direction toward the first belt to bring the loaded media into contact with the first belt when the media are deposited; and moves in a downward direction to be spaced apart from the first belt to provide a space in which a rejected and returned medium is loaded when the medium is rejected and returned.

5. A bundle module of a medium deposit device, in which deposit media in units of bundles are input or which receives rejected bill media in units of bundles, the bundle module comprising:

a transfer path which provides a deposit path or reject path of media;

a first belt which is provided above the transfer path and rotatably driven;

a second belt which is provided under the transfer path and rotatably driven and on which the media are loaded and stacked; and a guide unit which is provided at one side of the first belt to provide a transfer surface for the deposited or rejected media, wherein, when the media are rejected, the guide unit rotates to be inclined downward toward one side so that a leading end portion of a rejected following medium is positioned on and overlaps a rear end portion of a rejected leading medium;

wherein, when the medium is deposited, the guide unit is horizontally positioned to provide a transfer surface for the deposited medium.

6. A bundle module of a medium deposit device, in which deposit media in units of bundles are input or which receives rejected bill media in units of bundles, the bundle module comprising:

a transfer path which provides a deposit path or reject path of media;

a first belt which is provided above the transfer path and rotatably driven;

a second belt which is provided under the transfer path and rotatably driven and on which the media are loaded and stacked; and a guide unit which is provided at one side of the first belt to provide a transfer surface for the deposited or rejected media, wherein, when the media are rejected, the guide unit rotates to be inclined downward toward one side so that a leading end portion of a rejected following medium is positioned on and overlaps a rear end portion of a rejected leading medium;

wherein:

a third belt configured to provide a transfer force so as to transfer a rejected bill medium to a preset loading position is further provided at one side of the first belt; and a plurality of return sheets which are spaced apart from each other in a longitudinal direction and protrude outward are provided on an outer surface of the third belt.

7. A bundle module of a medium deposit device, in which deposit media in units of bundles are input or which receives rejected bill media in units of bundles, the bundle module comprising:

a transfer path which provides a deposit path or reject path of media;

a first belt which is provided above the transfer path and rotatably driven;

a second belt which is provided under the transfer path and rotatably driven and on which the media are loaded and stacked; and a guide unit which is provided at one side of the first belt to provide a transfer surface for the deposited or rejected media, wherein, when the media are rejected, the guide unit rotates to be inclined downward toward one side so that a leading end portion of a rejected following medium is positioned on and overlaps a rear end portion of a rejected leading medium;

wherein the guide unit includes a separation roller, wherein, when the media are deposited, rotation of the separation roller is stopped so that the loaded media are separated into individual sheets, and when the medium is rejected, the separation roller rotates to provide a return force to a rejected bill medium.

* * * * *